(12) United States Patent
Davis et al.

(10) Patent No.: US 10,050,970 B2
(45) Date of Patent: *Aug. 14, 2018

(54) SYSTEM AND METHOD FOR DATA CENTER SECURITY ENHANCEMENTS LEVERAGING SERVER SOCS OR SERVER FABRICS

(71) Applicant: III HOLDINGS 2, LLC, Wilmington, DE (US)

(72) Inventors: Mark Davis, Austin, TX (US); David Borland, Austin, TX (US); Jason Hobbs, Leander, TX (US); Danny Marquette, Austin, TX (US); Thomas A. Volpe, Austin, TX (US); Ken Goss, Round Rock, TX (US)

(73) Assignee: III Holdings 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,418

(22) Filed: Aug. 9, 2017

(65) Prior Publication Data
US 2017/0359347 A1 Dec. 14, 2017

Related U.S. Application Data

(63) Continuation of application No. 15/360,668, filed on Nov. 23, 2016, now Pat. No. 9,749,326, which is a
(Continued)

(51) Int. Cl.
*H04L 12/28* (2006.01)
*H04L 29/06* (2006.01)
(Continued)

(52) U.S. Cl.
CPC ............ *H04L 63/10* (2013.01); *H04L 41/046* (2013.01); *H04L 45/60* (2013.01); *H04L 45/74* (2013.01);
(Continued)

(58) Field of Classification Search
CPC ..... H04L 12/56; H04L 2012/56; H04L 45/02; H04L 45/04; H04L 45/10
See application file for complete search history.

(56) References Cited

U.S. PATENT DOCUMENTS

| | | |
|---|---|---|
| 5,451,936 A | 9/1995 | Yang et al. |
| 5,594,908 A | 1/1997 | Hyatt |

(Continued)

FOREIGN PATENT DOCUMENTS

| | | |
|---|---|---|
| DE | 60216001 | 7/2007 |
| DE | 11 2008 001 875 | 6/2010 |

(Continued)

OTHER PUBLICATIONS

Non-Final Office Action on U.S. Appl. No. 15/357,332 dated Nov. 9, 2017.
(Continued)

*Primary Examiner* — Afshawn M Towfighi

(57) ABSTRACT

A data center security system and method are provided that leverage server systems on a chip (SOCs) and/or server fabrics. In more detail, server interconnect fabrics may be leveraged and extended to dramatically improve security within a data center.

20 Claims, 8 Drawing Sheets

Related U.S. Application Data continuation of application No. 14/725,543, filed on May 29, 2015, now Pat. No. 9,509,552, which is a continuation of application No. 13/475,713, filed on May 18, 2012, now Pat. No. 9,054,990, which is a continuation-in-part of application No. 12/794,996, filed on Jun. 7, 2010.

(60) Provisional application No. 61/489,569, filed on May 24, 2011, provisional application No. 61/256,723, filed on Oct. 30, 2009.

(51) Int. Cl.
| | |
|---|---|
| *H04L 12/741* | (2013.01) |
| *H04L 29/08* | (2006.01) |
| *H04L 12/773* | (2013.01) |
| *H04L 12/931* | (2013.01) |
| *H04L 12/935* | (2013.01) |
| *H04L 12/933* | (2013.01) |
| *H04L 12/24* | (2006.01) |

(52) U.S. Cl.
CPC ........ *H04L 49/109* (2013.01); *H04L 49/3009* (2013.01); *H04L 49/351* (2013.01); *H04L 49/356* (2013.01); *H04L 63/164* (2013.01); *H04L 67/32* (2013.01)

(56) References Cited

U.S. PATENT DOCUMENTS

| | | | |
|---|---|---|---|
| 5,623,641 | A | 4/1997 | Kadoyashiki |
| 5,781,187 | A | 7/1998 | Gephardt et al. |
| 5,901,048 | A | 5/1999 | Hu |
| 5,908,468 | A | 6/1999 | Hartmann |
| 5,968,176 | A | 10/1999 | Nessett et al. |
| 5,971,804 | A | 10/1999 | Gallagher et al. |
| 6,055,618 | A | 4/2000 | Thorson |
| 6,141,214 | A | 10/2000 | Ahn |
| 6,181,699 | B1 | 1/2001 | Crinion et al. |
| 6,192,414 | B1 | 2/2001 | Horn |
| 6,198,741 | B1 | 3/2001 | Yoshizawa et al. |
| 6,314,487 | B1 | 11/2001 | Hahn et al. |
| 6,314,501 | B1 | 11/2001 | Gulick et al. |
| 6,373,841 | B1 | 4/2002 | Goh et al. |
| 6,442,137 | B1 | 8/2002 | Yu et al. |
| 6,446,192 | B1 | 9/2002 | Narasimhan et al. |
| 6,452,809 | B1 | 9/2002 | Jackson et al. |
| 6,507,586 | B1 | 1/2003 | Satran et al. |
| 6,556,952 | B1 | 4/2003 | Magro |
| 6,574,238 | B1 | 6/2003 | Thrysoe |
| 6,661,671 | B1 | 12/2003 | Franke et al. |
| 6,711,691 | B1 | 3/2004 | Howard et al. |
| 6,766,389 | B2 | 7/2004 | Hayter et al. |
| 6,813,676 | B1 | 11/2004 | Henry et al. |
| 6,816,750 | B1 | 11/2004 | Klaas |
| 6,842,430 | B1 | 1/2005 | Melnik |
| 6,857,026 | B1 | 2/2005 | Cain |
| 6,963,926 | B1 | 11/2005 | Robinson |
| 6,963,948 | B1 | 11/2005 | Gulick |
| 6,977,939 | B2 | 12/2005 | Joy et al. |
| 6,988,170 | B2 | 1/2006 | Barroso et al. |
| 6,990,063 | B1 | 1/2006 | Lenoski et al. |
| 7,020,695 | B1 | 3/2006 | Kundu et al. |
| 7,032,119 | B2 | 4/2006 | Fung |
| 7,080,078 | B1 | 7/2006 | Slaughter et al. |
| 7,080,283 | B1 | 7/2006 | Songer et al. |
| 7,095,738 | B1 | 8/2006 | Desanti |
| 7,119,591 | B1 | 10/2006 | Lin |
| 7,143,153 | B1 | 11/2006 | Black et al. |
| 7,165,120 | B1 | 1/2007 | Giles et al. |
| 7,170,315 | B2 | 1/2007 | Bakker et al. |
| 7,180,866 | B1 | 2/2007 | Chartre et al. |
| 7,203,063 | B2 | 4/2007 | Bash et al. |
| 7,257,655 | B1 | 8/2007 | Burney et al. |
| 7,263,288 | B1 | 8/2007 | Islam |
| 7,274,705 | B2 | 9/2007 | Chang et al. |
| 7,278,582 | B1 | 10/2007 | Siegel et al. |
| 7,310,319 | B2 * | 12/2007 | Awsienko ............... H04L 45/04 370/254 |
| 7,325,050 | B2 | 1/2008 | O'Connor et al. |
| 7,337,333 | B2 | 2/2008 | O'Conner et al. |
| 7,340,777 | B1 | 3/2008 | Szor |
| 7,353,362 | B2 | 4/2008 | Georgiou et al. |
| 7,382,154 | B2 | 6/2008 | Ramos et al. |
| 7,386,888 | B2 | 6/2008 | Liang et al. |
| 7,418,534 | B2 | 8/2008 | Hayter et al. |
| 7,437,540 | B2 | 10/2008 | Paolucci et al. |
| 7,447,147 | B2 | 11/2008 | Nguyen et al. |
| 7,447,197 | B2 | 11/2008 | Terrell et al. |
| 7,466,712 | B2 | 12/2008 | Makishima et al. |
| 7,467,306 | B2 | 12/2008 | Cartes et al. |
| 7,467,358 | B2 | 12/2008 | Kang et al. |
| 7,502,884 | B1 | 3/2009 | Shah et al. |
| 7,519,843 | B1 | 4/2009 | Buterbaugh et al. |
| 7,555,666 | B2 | 6/2009 | Brundridge et al. |
| 7,583,661 | B2 | 9/2009 | Chaudhuri |
| 7,586,841 | B2 | 9/2009 | Vasseur |
| 7,596,144 | B2 | 9/2009 | Pong |
| 7,599,360 | B2 | 10/2009 | Edsall et al. |
| 7,606,225 | B2 | 10/2009 | Xie et al. |
| 7,606,245 | B2 | 10/2009 | Ma et al. |
| 7,616,646 | B1 | 11/2009 | Ma et al. |
| 7,620,057 | B1 | 11/2009 | Aloni et al. |
| 7,644,215 | B2 | 1/2010 | Wallace et al. |
| 7,657,677 | B2 | 2/2010 | Huang et al. |
| 7,657,756 | B2 | 2/2010 | Hall |
| 7,660,922 | B2 | 2/2010 | Harriman |
| 7,664,110 | B1 | 2/2010 | Lovett et al. |
| 7,673,164 | B1 | 3/2010 | Agarwal |
| 7,710,936 | B2 | 5/2010 | Morales Barroso |
| 7,719,834 | B2 | 5/2010 | Miyamoto et al. |
| 7,721,125 | B2 | 5/2010 | Fung |
| 7,751,433 | B2 | 7/2010 | Dollo et al. |
| 7,760,720 | B2 | 7/2010 | Pullela et al. |
| 7,761,687 | B2 | 7/2010 | Blumrich et al. |
| 7,783,910 | B2 | 8/2010 | Felter et al. |
| 7,791,894 | B2 | 9/2010 | Bechtolsheim |
| 7,792,113 | B1 | 9/2010 | Foschiano et al. |
| 7,796,399 | B2 | 9/2010 | Clayton et al. |
| 7,801,132 | B2 | 9/2010 | Ofek et al. |
| 7,802,017 | B2 | 9/2010 | Uemura et al. |
| 7,805,575 | B1 | 9/2010 | Agarwal et al. |
| 7,831,839 | B2 | 11/2010 | Hatakeyama |
| 7,840,703 | B2 | 11/2010 | Arimilli et al. |
| 7,865,614 | B2 | 1/2011 | Lu et al. |
| 7,925,795 | B2 | 4/2011 | Tamir et al. |
| 7,934,005 | B2 | 4/2011 | Fascenda |
| 7,970,929 | B1 | 6/2011 | Mahalingaiah |
| 7,975,110 | B1 | 7/2011 | Spaur et al. |
| 7,991,817 | B2 | 8/2011 | Dehon et al. |
| 7,991,922 | B2 | 8/2011 | Hayter et al. |
| 7,992,151 | B2 | 8/2011 | Warrier et al. |
| 8,019,832 | B2 | 9/2011 | De Sousa et al. |
| 8,060,760 | B2 | 11/2011 | Shetty et al. |
| 8,060,775 | B1 | 11/2011 | Sharma et al. |
| 8,082,400 | B1 | 12/2011 | Chang et al. |
| 8,108,508 | B1 | 1/2012 | Goh et al. |
| 8,122,269 | B2 | 2/2012 | Houlihan et al. |
| 8,132,034 | B2 | 3/2012 | Lambert et al. |
| 8,155,113 | B1 | 4/2012 | Agarwal |
| 8,156,362 | B2 | 4/2012 | Branover et al. |
| 8,165,120 | B2 | 4/2012 | Maruccia et al. |
| 8,170,040 | B2 | 5/2012 | Konda |
| 8,180,996 | B2 | 5/2012 | Fullerton et al. |
| 8,189,612 | B2 | 5/2012 | Lemaire et al. |
| 8,194,659 | B2 | 6/2012 | Ban |
| 8,199,636 | B1 | 6/2012 | Rouyer et al. |
| 8,205,103 | B2 | 6/2012 | Kazama et al. |
| 8,379,425 | B2 | 2/2013 | Fukuoka et al. |
| 8,397,092 | B2 | 3/2013 | Karnowski |
| 8,407,428 | B2 | 3/2013 | Cheriton et al. |
| 8,504,791 | B2 | 8/2013 | Cheriton et al. |

(56) References Cited

U.S. PATENT DOCUMENTS

| | | |
|---|---|---|
| RE44,610 E | 11/2013 | Krakirian et al. |
| 8,599,863 B2 | 12/2013 | Davis |
| 8,684,802 B1 | 4/2014 | Gross et al. |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,321 B2 | 7/2014 | Harriman et al. |
| 8,812,400 B2 | 8/2014 | Faraboschi et al. |
| 8,824,485 B2 | 9/2014 | Biswas et al. |
| 8,854,831 B2 | 10/2014 | Arnouse |
| 8,903,964 B2 | 12/2014 | Breslin et al. |
| 9,008,079 B2 | 4/2015 | Davis et al. |
| 9,075,655 B2 | 7/2015 | Davis et al. |
| 9,311,269 B2 | 4/2016 | Davis et al. |
| 9,465,771 B2 | 10/2016 | Davis et al. |
| 2001/0046227 A1 | 11/2001 | Matsuhira et al. |
| 2002/0004912 A1 | 1/2002 | Fung |
| 2002/0040391 A1 | 4/2002 | Chaiken et al. |
| 2002/0083352 A1 | 6/2002 | Fujimoto et al. |
| 2002/0097732 A1 | 7/2002 | Worster et al. |
| 2002/0107903 A1 | 8/2002 | Richter et al. |
| 2002/0124128 A1 | 9/2002 | Qiu |
| 2002/0159452 A1* | 10/2002 | Foster .................. H04L 49/357 370/389 |
| 2002/0161917 A1 | 10/2002 | Shapiro et al. |
| 2002/0172205 A1 | 11/2002 | Tagore-Brage et al. |
| 2002/0186656 A1 | 12/2002 | Vu |
| 2002/0194412 A1 | 12/2002 | Bottom |
| 2002/0196611 A1 | 12/2002 | Ho et al. |
| 2003/0007493 A1 | 1/2003 | Oi et al. |
| 2003/0033547 A1 | 2/2003 | Larson et al. |
| 2003/0041266 A1 | 2/2003 | Ke et al. |
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 | 9/2003 | Williams |
| 2003/0188083 A1 | 10/2003 | Kumar et al. |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh et al. |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0021728 A1 | 1/2005 | Sugimoto |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1 | 6/2005 | Lim et al. |
| 2005/0228852 A1 | 10/2005 | Santos et al. |
| 2005/0240688 A1 | 10/2005 | Moerman et al. |
| 2005/0259397 A1 | 11/2005 | Bash et al. |
| 2006/0002311 A1 | 1/2006 | Iwanaga et al. |
| 2006/0013218 A1 | 1/2006 | Shore et al. |
| 2006/0023245 A1 | 2/2006 | Sato et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1 | 8/2006 | Clark et al. |
| 2006/0236371 A1 | 10/2006 | Fish |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0047195 A1 | 3/2007 | Merkin et al. |
| 2007/0076653 A1 | 4/2007 | Park et al. |
| 2007/0081315 A1 | 4/2007 | Mondor et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0174390 A1 | 7/2007 | Silvain et al. |
| 2007/0180310 A1 | 8/2007 | Johnson et al. |
| 2007/0209072 A1 | 9/2007 | Chen |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0239649 A1 | 10/2008 | Bradicich et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0310848 A1 | 12/2008 | Yasuda et al. |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1* | 3/2009 | Witkowski ............ H04L 49/352 370/392 |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0216920 A1 | 8/2009 | Lauterbach et al. |
| 2009/0219827 A1 | 9/2009 | Chen et al. |
| 2009/0222884 A1* | 9/2009 | Shaji ..................... H04L 41/082 726/1 |
| 2009/0225751 A1 | 9/2009 | Koenck et al. |
| 2009/0235104 A1 | 9/2009 | Fung |

(56) References Cited

U.S. PATENT DOCUMENTS

| | | |
|---|---|---|
| 2009/0248943 A1 | 10/2009 | Jiang et al. |
| 2009/0251867 A1 | 10/2009 | Sharma |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0198972 A1 | 8/2010 | Umbehocker |
| 2010/0198985 A1 | 8/2010 | Kanevsky et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0173612 A1 | 7/2011 | El Zur et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0307887 A1 | 12/2011 | Huang et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1 | 6/2013 | Hama et al. |
| 2013/0163605 A1 | 6/2013 | Chandra et al. |
| 2013/0275703 A1 | 10/2013 | Schenfeld et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |
| 2016/0161909 A1 | 6/2016 | Wada |

FOREIGN PATENT DOCUMENTS

| | | |
|---|---|---|
| JP | 2005-223753 | 8/2005 |
| JP | 2005-536960 | 12/2005 |
| TW | M377621 | 4/2010 |
| TW | 201017430 | 5/2010 |
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Notice of Allowance on U.S. Appl. No. 15/270,418 dated Nov. 2, 2017.

Advanced Switching Technology Tech Brief, published 2005, 2 pages.

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Das et al., "Unifying Packet and Circuit Switched Networks," IEEE Globecom Workshops 2009, Nov. 30 2009, pp. 1-6.

Deering, "IP Multicast Extensions for 4.3BSD UNIX and related Systems," Jun. 1999, 5 pages.

Elghany et al., "High Throughput High Performance NoC Switch," NORCHIP 2008, Nov. 2008, pp. 237-240.

Extended European Search Report for EP 10827330.1, dated Jun. 5, 2013.

Final Office Action on U.S. Appl. No. 12/889,721, dated Apr. 17, 2014.

Final Office Action on U.S. Appl. No. 13/234,054, dated Jan. 26, 2016.

Final Office Action on U.S. Appl. No. 13/692,741, dated Mar. 11, 2015.

Final Office Action on U.S. Appl. No. 12/794,996, dated Jun. 19, 2013.

Final Office Action on U.S. Appl. No. 12/889,721 dated Aug. 2, 2016.

Final Office Action on U.S. Appl. No. 12/889,721, dated May 22, 2015.

Final Office Action on U.S. Appl. No. 13/234,054 dated May 31, 2017.

Final Office Action on U.S. Appl. No. 13/234,054, dated Apr. 16, 2015.

Final Office Action on U.S. Appl. No. 13/475,713, dated Oct. 17, 2014.

Final Office Action on U.S. Appl. No. 13/475,722, dated Oct. 20, 2014.

(56) References Cited

OTHER PUBLICATIONS

Final Office Action on U.S. Appl. No. 13/527,498, dated Nov. 17, 2014.
Final Office Action on U.S. Appl. No. 13/527,505, dated Dec. 5, 2014.
Final Office Action on U.S. Appl. No. 13/624,725 dated Mar. 10, 2016.
Final Office Action on U.S. Appl. No. 13/624,725, dated Nov. 13, 2013.
Final Office Action on U.S. Appl. No. 13/624,731, dated Jul. 25, 2014.
Final Office Action on U.S. Appl. No. 13/662,759, dated Feb. 22, 2016.
Final Office Action on U.S. Appl. No. 13/705,340, dated Aug. 2, 2013.
Final Office Action on U.S. Appl. No. 13/705,414, dated Aug. 9, 2013.
Final Office Action on U.S. Appl. No. 13/728,428 dated May 6, 2016.
Final Office Action on U.S. Appl. No. 14/052,723, dated Dec. 3, 2015.
Final Office Action on U.S. Appl. No. 14/106,697 dated Feb. 2, 2016.
Final Office Action on U.S. Appl. No. 14/106,698, dated Aug. 19, 2015.
Final Office Action on U.S. Appl. No. 14/334,178, dated Nov. 4, 2015.
Final Office Action on U.S. Appl. No. 14/334,931, dated Jul. 9, 2015.
Final Office Action on U.S. Appl. No. 14/809,723 dated Aug. 25, 2017.
Final Office Action on U.S. Appl. No. 15/281,462 dated Jun. 13, 2017.
Final Office Action on U.S. Appl. No. 13/624,731, dated Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on Chip," 2005 IEEE Pacific Rim Conference on Communicatinos, Computers and Signal Processing, Aug. 2005, pp. 613-616.
HP ProLiant SL6500 Scalable System, Family data sheet, HP Technical sheet, Sep. 2010 4 pages.
HP Virtual Connect Traffic Flow—Technology brief, Jan. 2012, 22 pages.
International Preliminary Report on Patentability for PCT/US2009/044200, dated Nov. 17, 2010.
International Preliminary Report on Patentability for PCT/US2012/038986 dated Nov. 26, 2013.
International Preliminary Report on Patentability for PCT/US2012/061747, dated Apr. 29, 2014.
International Preliminary Report on Patentability issued on PCT/US12/62608, dated May 6, 2014.
International Search Report and Written Opinion for PCT/US12/38987, dated Aug. 16, 2012.
International Search Report and Written Opinion for PCT/US12/61747, dated Mar. 1, 2013.
International Search Report and Written Opinion for PCT/US12/62608, dated Jan. 18, 2013.
International Search Report and Written Opinion for PCT/US2010/053227, dated May 10, 2012.
International Search Report and Written Opinion for PCT/US2011/051996, dated Jan. 19, 2012.
International Search Report and Written Opinion on PCT/US09/44200, dated Jul. 1, 2009.
International Search Report and Written Opinion on PCT/US2012/038986, dated Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, dated Feb. 21, 2014.
Non-Final Office Action on U.S. Appl. No. 15/281,462 dated Feb. 10, 2017.
Non-Final Office Action on U.S. Appl. No. 15/254,111 dated Jun. 20, 2017.
Non-Final Office Action on U.S. Appl. No. 14/334,178 dated Dec. 18, 2015.
Non-Final Office Action on U.S. Appl. No. 12/889,721, dated Feb. 24, 2016.
Non-Final Office Action on U.S. Appl. No. 12/889,721, dated Jul. 2, 2013.
Non-Final Office Action on U.S. Appl. No. 13/475,722, dated Jan. 17, 2014.
Non-Final Office Action on U.S. Appl. No. 12/794,996, dated Sep. 17, 2012.
Non-Final Office Action on U.S. Appl. No. 12/889,721, dated Oct. 11, 2012.
Non-Final Office Action on U.S. Appl. No. 12/889,721, dated Sep. 29, 2014.
Non-Final Office Action on U.S. Appl. No. 13/234,054 dated Oct. 20, 2016.
Non-Final Office Action on U.S. Appl. No. 13/234,054, dated Oct. 23, 2014.
Non-Final Office Action on U.S. Appl. No. 13/234,054, dated Aug. 6, 2015.
Non-Final Office Action on U.S. Appl. No. 13/284,855, dated Dec. 19, 2013.
Non-Final Office Action on U.S. Appl. No. 13/453,086, dated Mar. 12, 2013.
Non-Final Office Action on U.S. Appl. No. 13/475,713, dated Apr. 1, 2014.
Non-Final Office Action on U.S. Appl. No. 13/527,505, dated May 8, 2014.
Non-Final Office Action on U.S. Appl. No. 13/527,498, dated May 8, 2014.
Non-Final Office Action on U.S. Appl. No. 13/624,725, dated Jan. 10, 2013.
Non-Final Office Action on U.S. Appl. No. 13/624,725, dated Apr. 23, 2015.
Non-final office action on U.S. Appl. No. 13/624,731 dated Jan. 29, 2013.
Non-Final Office Action on U.S. Appl. No. 13/662,759, dated Nov. 6, 2014.
Non-Final Office Action on U.S. Appl. No. 13/692,741, dated Sep. 4, 2014.
Non-Final Office Action on U.S. Appl. No. 13/692,741, dated Jul. 1, 2015.
Non-Final Office Action on U.S. Appl. No. 13/705,286, dated May 13, 2013.
Non-Final Office Action on U.S. Appl. No. 13/705,340, dated Mar. 12, 2014.
Non-Final Office Action on U.S. Appl. No. 13/705,340, dated Mar. 29, 2013.
Non-Final Office Action on U.S. Appl. No. 13/705,414, dated Apr. 9, 2013.
Non-Final Office Action on U.S. Appl. No. 13/728,308, dated May 14, 2015.
Non-Final Office Action on U.S. Appl. No. 13/728,428, dated Jun. 12, 2015.
Non-Final Office Action on U.S. Appl. No. 14/052,723, dated May 1, 2015.
Non-Final Office Action on U.S. Appl. No. 14/106,697, dated Aug. 17, 2015.
Non-Final Office Action on U.S. Appl. No. 14/106,698, dated Feb. 12, 2015.

(56) References Cited

OTHER PUBLICATIONS

Non-Final Office Action on U.S. Appl. No. 14/334,931, dated Jan. 5, 2015.
Non-Final Office Action on U.S. Appl. No. 14/725,543 dated Apr. 7, 2016.
Non-Final Office Action on U.S. Appl. No. 14/753,948 dated Nov. 4, 2016.
Non-Final Office Action on U.S. Appl. No. 14/809,723 dated Dec. 30, 2016.
Non-Final Office Action on U.S. Appl. No. 15/078,115 dated Sep. 5, 2017.
Non-Final Office Action on U.S. Appl. No. 15/270,418 dated Apr. 21, 2017.
Non-Final Office Action on U.S. Appl. No. 13/705,428, dated Jul. 10, 2013.
Non-Final Office Action on U.S. Appl. No. 14/334,931 dated Dec. 11, 2015.
Notice of Allowance issued on U.S. Appl. No. 14/052,723, dated Feb. 8, 2017.
Notice of Allowance on U.S. Appl. No. 14/334,931 dated May 20, 2016.
Notice of Allowance on U.S. Appl. No. 13/234,054, dated Sep. 19, 2017.
Notice of Allowance on U.S. Appl. No. 13/453,086, dated Jul. 18, 2013.
Notice of Allowance on U.S. Appl. No. 13/475,713, dated Feb. 5, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/624,725, dated Mar. 30, 2016.
Notice of Allowance on U.S. Appl. No. 13/624,731, dated Mar. 5, 2015.
Notice of Allowance on U.S. Appl. No. 13/705,340, dated Dec. 3, 2014.
Notice of Allowance on U.S. Appl. No. 13/705,386, dated Jan. 24, 2014.
Notice of Allowance on U.S. Appl. No. 13/705,414, dated Nov. 4, 2013.
Notice of Allowance on U.S. Appl. No. 13/728,428 dated Jul. 18, 2016.
Notice of Allowance on U.S. Appl. No. 14/106,697 dated Oct. 24, 2016.
Notice of Allowance on U.S. Appl. No. 14/725,543 dated Jul. 21, 2016.
Notice of Allowance on U.S. Appl. No. 14/753,948 dated Jun. 14, 2017.
Notice of Allowance on U.S. Appl. No. 15/254,111 dated Sep. 1, 2017.
Notice of Allowance on U.S. Appl. No. 15/360,668, dated May 5, 2017.
Notice of Allowance on U.S. Appl. No. 13/284,855, dated Jul. 14, 2014.
Notice of Allowance on U.S. Appl. No. 13/662,759 dated May 10, 2016.
Notice of Allowance on U.S. Appl. No. 13/692,741 dated Dec. 4, 2015.
Notice of Allowance on U.S. Appl. No. 14/334,178 dated Jun. 8, 2016.
Notice of Allowance U.S. Appl. No. 13/728,308, dated Oct. 7, 2015.
Office Action on Taiwan Application 100133390, dated Aug. 25, 2015 (English translation not available).
Office Action on Taiwan Application 101139729, dated May 25, 2015 (English translation not available).
Pande et al., "Design of a Switch for Network on Chip Applications," May 25-28 2003 Proceedings of the 2003 International Symposium on Circuits and Systems, vol. 5, pp. V217-V220.
Reexamination Report on Japanese Application 2012-536877, dated Jan. 22, 2015 (English Translation not available).
Search Report on EP Application 10827330.1, dated Feb. 12, 2015.
Venaas, "IPv4 Multicast Address Space Registry," 2013, http://www.iana.org/assignments/multicast-addresses/multicast-addresses.xhtml.
Non-Final Office Action on U.S. Appl. No. 15/042,489 dated Jan. 9, 2018.
Non-Final Office Action on U.S. Appl. No. 15/281,462 dated Dec. 15, 2017.
Notice of Allowance on U.S. Appl. No. 14/809,723 dated Jan. 11, 2018.
Notice of Allowance on U.S. Appl. No. 15/078,115 dated Jan. 8, 2018.
Notice of Allowance on U.S. Appl. No. 15/430,959 dated Mar. 15, 2018.
Final Office Action on U.S. Appl. No. 15/281,462, dated Apr. 6, 2018.
Final Office Action on U.S. Appl. No. 15/357,332 dated May 9, 2018.

* cited by examiner

SYSTEM AND METHOD FOR DATA CENTER SECURITY ENHANCEMENTS LEVERAGING SERVER SOCS OR SERVER FABRICS

CROSS-REFERENCE TO RELATED PATENT APPLICATIONS

This application is a Continuation of U.S. application Ser. No. 15/360,668, filed Nov. 23, 2016, which is a Continuation of U.S. application Ser. No. 14/725543, filed May 29, 2015, which is a Continuation of U.S. application Ser. No. 13/475713, filed May 18, 2012, which is a Continuation-In-Part of U.S. application Ser. No. 12/794996, filed Jun. 7, 2010, which claims priority to U.S. Provisional Application 61/256723, filed Oct. 30, 2009. U.S. application Ser. No. 13/475713 also claims priority to U.S. Provisional Application 61/489569, filed May 24, 2011. Each of the above-referenced application is incorporated herein by reference in their respective entireties.

FIELD

The disclosure relates generally to security aspects for data centers and in particular to data center security enhancements leveraging server systems on a chip (SOCs) or server switch fabrics.

BACKGROUND

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers. These typical data centers do not have good security.

The idea of network security is well known. The terms used in field of network security may include deep packet inspection (DPI) and intrusion prevention systems (IPS) which are also known as Intrusion Detection and Prevention Systems (IDPS) and are network security appliances that monitor network and/or system activities for malicious activity. The main functions of intrusion prevention systems are to identify malicious activity, log information about said activity, attempt to block/stop activity, and report activity. The network security may also utilize an intrusion detection system (IDS), which is a device or software application that monitors network and/or system activities for malicious activities or policy violations and produces reports to a Management Station.

FIG. 2 shows a typical implementation of an IDS and IPS within a corporate network. In the typical implementation, the IDS is focused on detection, monitoring, and reporting of potential intrusions. As such, the IDS is implemented out-of-line of the core network flow and is not invasive (located outside of the firewall and attached to a DMZ switch as shown in FIG. 2). The IPS adds the capability to prevent and block potential intrusion or undesired network flows and the IPS is implemented in-line of the core network flow.

Thus, it is desirable to provide a data center security system and method that leverage server systems on a chip (SOCs) and/or server fabrics, and it is to this end that the disclosure is directed.

DETAILED DESCRIPTION OF ONE OR MORE EMBODIMENTS

The disclosure is particularly applicable to a Calxeda™ server system on a chip and Calxeda™ switch fabrics as illustrated and described below with the security aspects and it is in this context that the disclosure will be described. However, the principles described below can be applied to other server-on-a-chip systems.

A server-on-a-chip (SOC) with packet switch functionality is focused on network aggregation. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support.

Figure 1A:
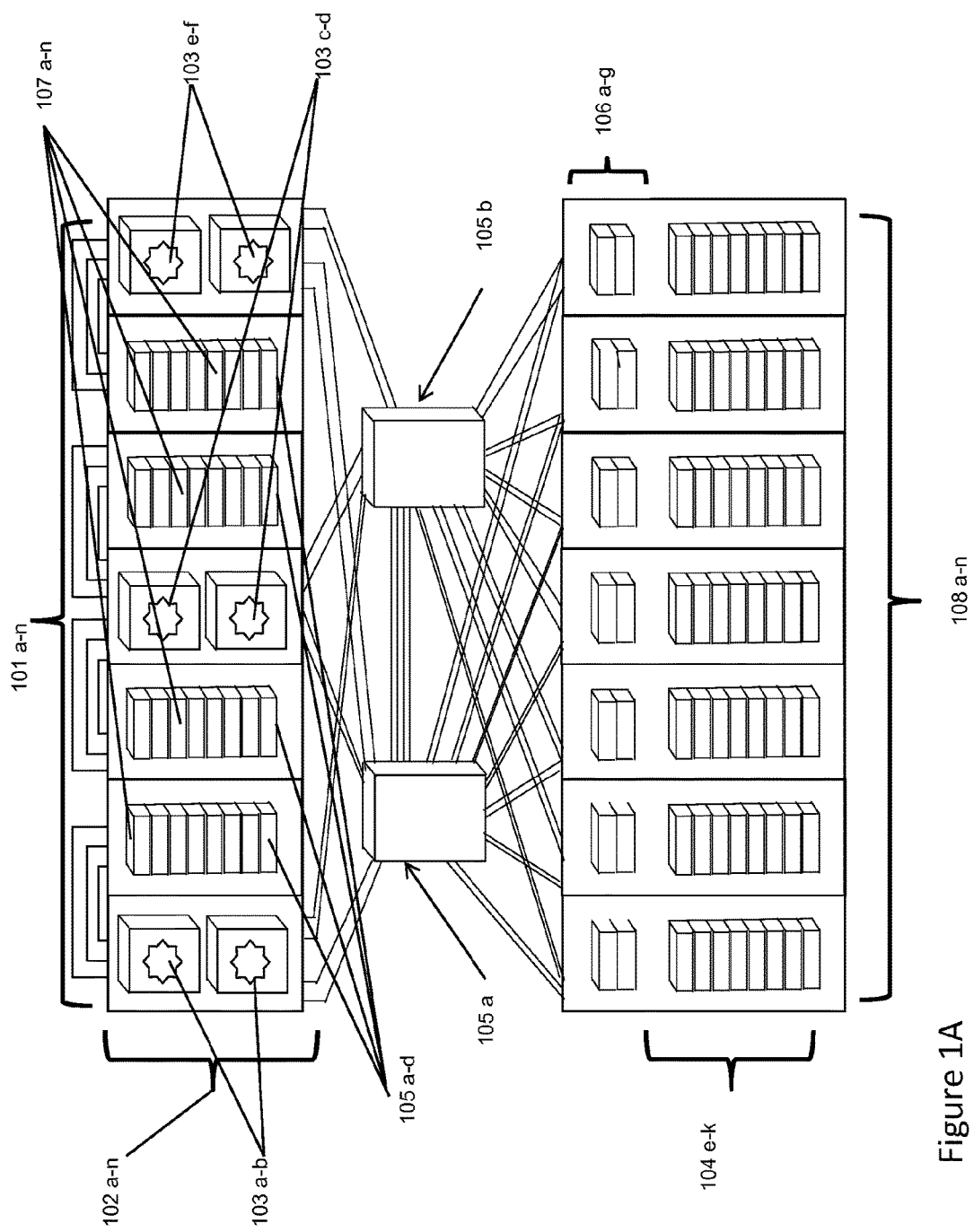
FIGS. 1A and 1B illustrate a typical data center system.
Figure 1B:
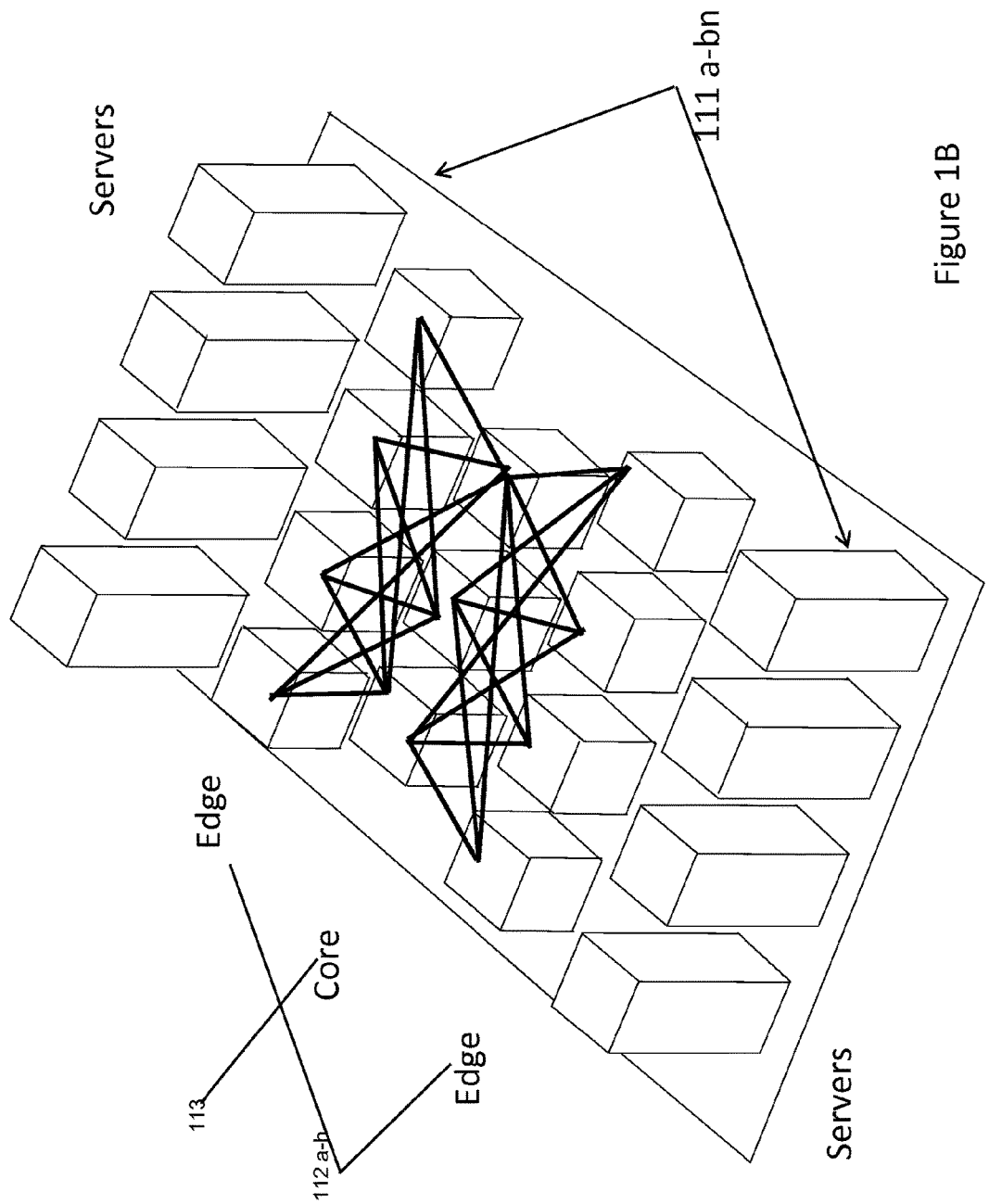
Figure 2:
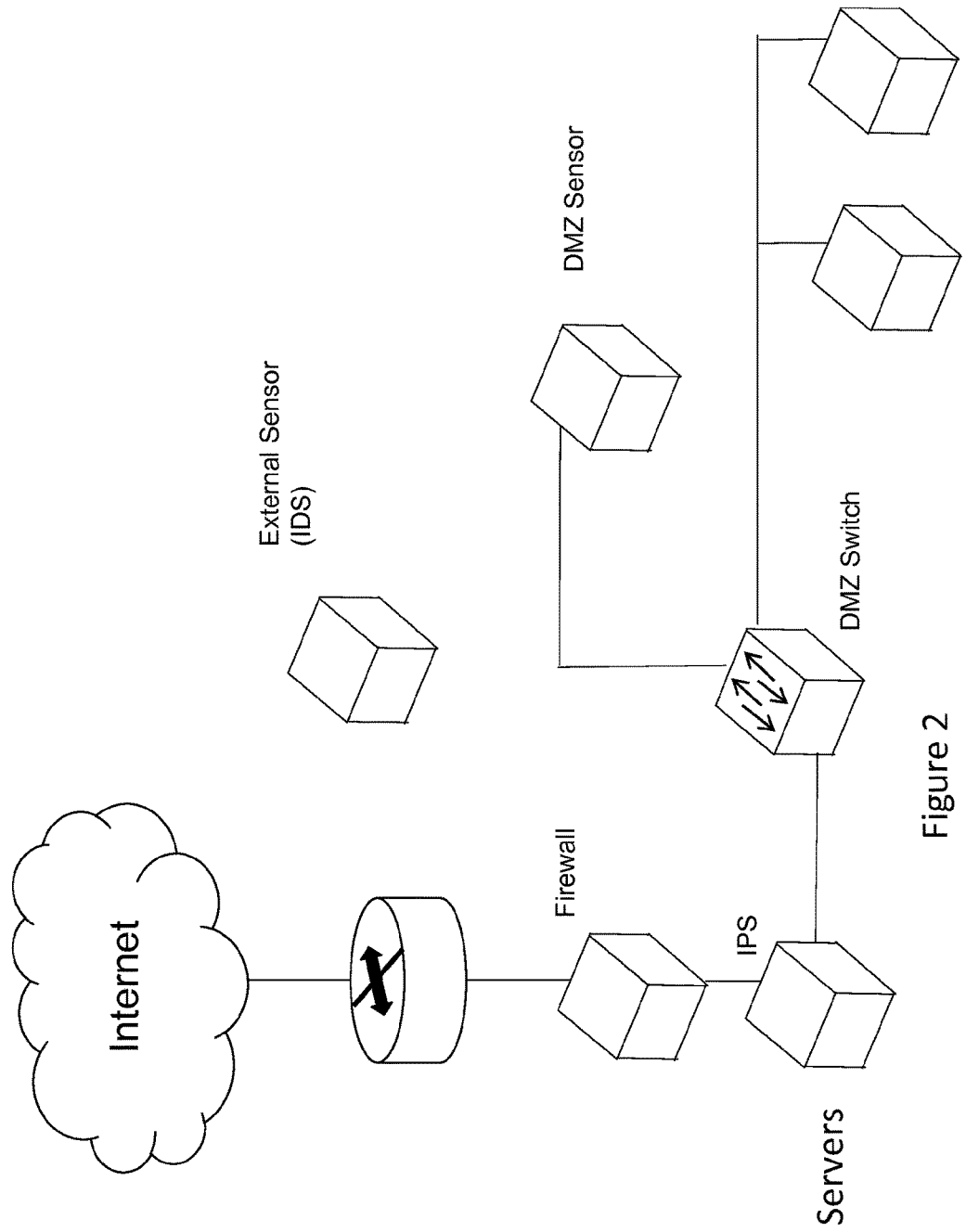
FIG. 2 shows a typical implementation of an IDS and IPS within a corporate network.
Figure 3:
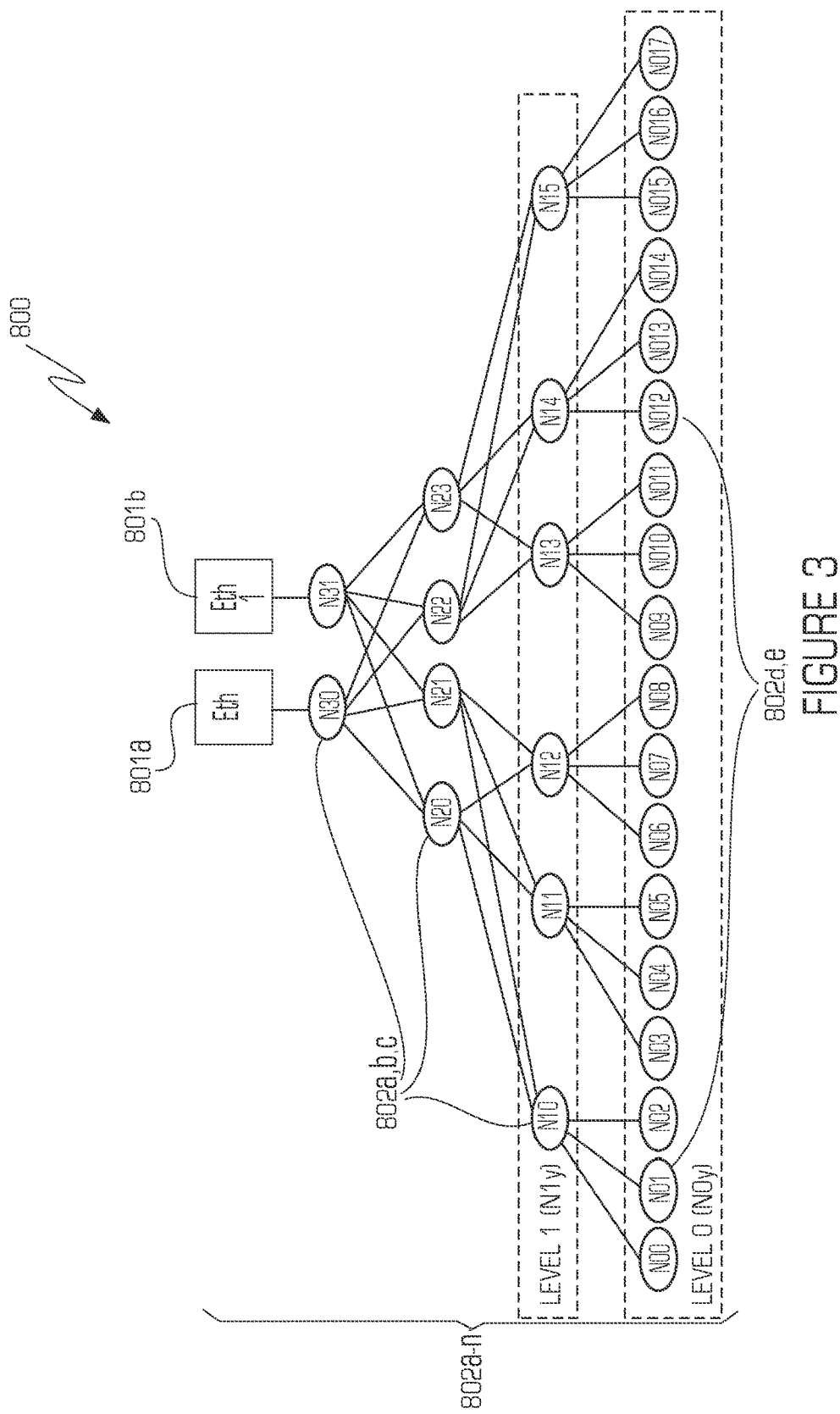
FIG. 3 illustrates a high-level topology of a network aggregating system that may be leveraged for increased security in a data center.

FIG. 3 shows a high-level topology 800 of the network system that illustrates XAUI (a well-known interface standard) connected SoC nodes connected by the switching fabric. Two 10 Gb Ethernet ports Eth0 801a and Eth1 801b come from the top of the tree. Ovals 802a-n are Calxeda™ nodes that comprise at least one computational processors and an embedded switch. Each node may have five XAUI links connected to the internal switch. The switching layers use all five XAUI links for switching. Level 0 leaf nodes 802d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree (the Ethernet ports) minimizes the average number of hops to the Ethernet.

The system and method also supports a routing using a tree-like or graph topology that supports multiple links per node, where each link is designated as an Up, Down, or Lateral link, or both, within the topology. In addition, each node in the system may be a combination computational/switch node, or just a switch node, and input/output (I/O) can reside on any node as described below in more detail. The system may also provide a system with a segmented Ethernet Media Access Control (MAC) architecture which may have a method of re-purposing MAC IP addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience.

A data center with the Calxeda™ server system on a chip may be implemented using the set of fabric connected nodes with Ethernet uplinks as shown in FIG. 3. Each node may be one or more Calxeda server boxes each of which has at least one Calxeda™ server system on a chip.

The system may also provide a rigorous security between the management processor cores, such that management processors can "trust" one another. In the example node 900 shown in FIG. 4 (which is described below in more detail), there is a management processor core within each SoC (block 906, FIG. 4). The software running on the management processor is trusted because a) the vendor (in this case Calxeda™) has developed and verified the code, b) non-vendor code is not allowed to run on the processor. Maintaining a Trust relationship between the management processors allow them to communicate commands (e.g. reboot another node) or request sensitive information from another node without worrying that a user could spoof the request and gain access to information or control of the system.

Typically the management processor, block 906, is running an embedded OS, while the multiple processor cores represented by block 905 are more typically running a standard operating system, such as Linux. The management processor would typically use one of the Ethernet MACs, in this case block 907, while the main processors, block 905, would utilize the remaining Ethernet MACs, in this case blocks 902 and 903.

Each routing header unit 901, that may be implemented as a processing unit or processor, prepends routing headers to layer 2 Ethernet frames to form a routing frame going into the fabric switch, and removes the routing headers as they leave the switch and enter standard Ethernet MACs. The routing frame is composed of the routing frame header plus the core part of the Ethernet frame, and is structured as shown in Table 1, below:

TABLE 1

Routing Header Prepended to Layer 2 Frame

| Routing Frame Header | | | Ethernet Frame Packet | | |
|---|---|---|---|---|---|
| RF Header | MAC destination | MAC Source | Ethertype/ Length | Payload (data and padding) | CRC32 |

The routing frame header (RF Header) typically consists of the fields shown in Table 2, below:

TABLE 2

Routing Header Fields

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node | 12 | Destination node ID |
| Dest Port | 2 | 0 = MAC0, 1 = MAC1, 2 = MAC_management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live—# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |
| Total | 46 | +checksum |

The Routing Header processor 901 contains a MAC Lookup CAM (Content Addressable Memory) (MCAM), macAddrLookup, that maps from 6 byte MAC addresses to 12-bit Node IDs, as shown in Table 3, below.

TABLE 3

MAC Address CAM (MCAM)

| MAC Lookup CAM Input | | MAC Lookup CAM Output | |
|---|---|---|---|
| Node Local | MAC Address | Node ID | Port ID |
| 1 bit | 6 bytes | 12 bits | 2 bits |

The approach to security domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff or spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector). Each of these options described in this paragraph are options that are implemented in the fabric switch, controlled by bits in the control status registers (CSRs) of the fabric switch. Software initializes the CSRs to the desired set of options.

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

Unicast routing is responsible for routing non-multicast (i.e. unicast) packets to the next node. This is done by utilizing a software computed unicastRoute[ ] next node routing table that provides a vector of available links to get to the destination node.

Server Interconnect Fabric Security

The above server fabric and switch fabric can benefit by enhanced security and a number of techniques to leverage and extend upon server interconnect fabrics that have some or all of the characteristics described above to dramatically improve security within a data center are described. The different embodiments implement "packet processing" which may include a wide range of packet processing including, but not limited to: IDS functionality, IPS functionality, sFlow monitoring (wherein sFlow is a specification for monitoring computer networks set forth in an sFlow specification that is RFC 3176) Packet routing or bridging between networks, Deep packet inspection, Packet logging, Transparent VPN encapsulation, Packet encryption/decryption and/or Packet compression/decompression.

Multi-Tenant Fabric Use Case

In a first embodiment, the server fabric domains are used to enhance security in fabric multi-tenant use case. In particular, there are data centers that host applications and data for multiple clients and networked servers within a single rack may host multiple clients. In the case of servers and nodes connected via interconnect fabrics, one example of which is described above, multiple clients may exist on separate nodes (such as the nodes shown in FIGS. 3 and 4 above) within a single fabric which is a multi-tenant fabric use case.

There are a couple of network security goals in this multi-tenant fabric use case:

Client A should have no possible way to inspect data from Client B, including Client B's network traffic.

Client A should have no possible way to spoof data to Client B's network. This case specifically covers the case where network packets cannot be hand crafted to look like they came from a Client B node, and routed to a Client B node.

Figure 5:
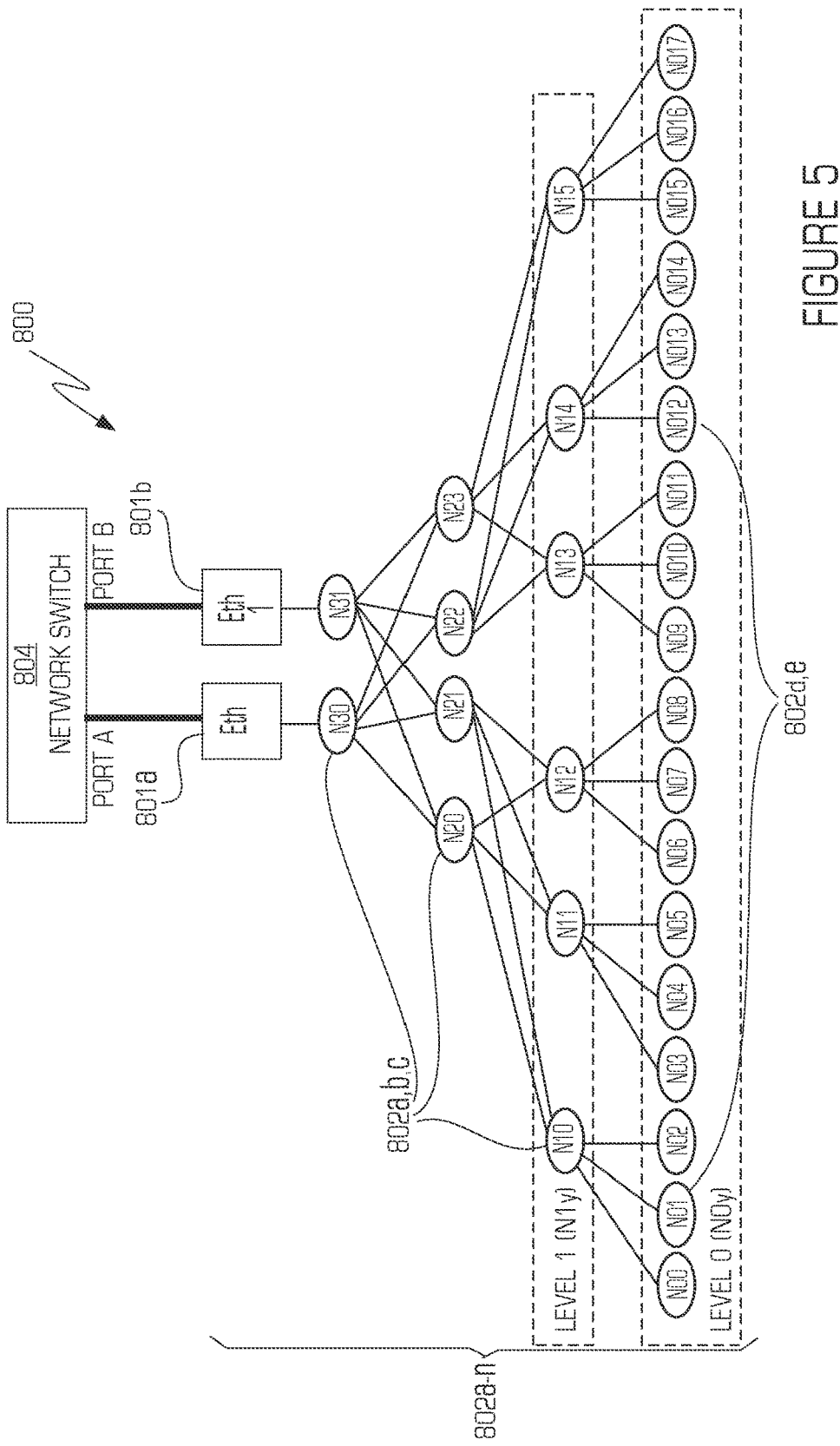
FIG. 5 illustrates a network aggregation system with a network switch and enhanced security.

To illustrate this embodiment, FIG. 5 illustrates a network aggregation system with a network switch and enhanced security. As shown in FIG. 5, a number of server nodes, 802a-n, are connected by a server interconnect fabric, there are two gateway nodes, N30 and N31, that serve as Ethernet gateways to the outside Ethernet network and there are two gateway Ethernet ports, 801a and 801b that are connected to a network switch 804, typically a top of rack switch, connecting to two ports on the switch, Port A and Port B.

When Client A's network traffic comes from Port A on the switch and Client B's network traffic comes from Port B on the switch, a common way for a network engineer to manage this multi client use would be to have a VLAN assigned to Client A and a different VLAN assigned to Client B. To guarantee isolation of Client A's traffic from Client B's traffic on the fabric, the following techniques (alone or in combination) can be used:

Map Client A's VLAN to Port A and Map Client B's VLAN to Port B.

Assign Fabric Domain A to Gateway Eth0 801a and assign Fabric Domain B to Gateway Eth1 801b.

Initialize every node in the fabric such that the node's MACs will only accept packets from that particular client's fabric domain. As an example, all the nodes in the cluster assigned to Client A will have the MAC fabric ports within that node to be assigned to only accept Domain A packets, and drop other domain packets.

Using this technique, there will be no packet visibility between the clients, and no packets (unicast or multicast) can be transferred directly between them on the fabric, which improves the security of the system by leveraging the server fabric.

Securing Inter-Management Processor Traffic within the Fabric

Figure 4:
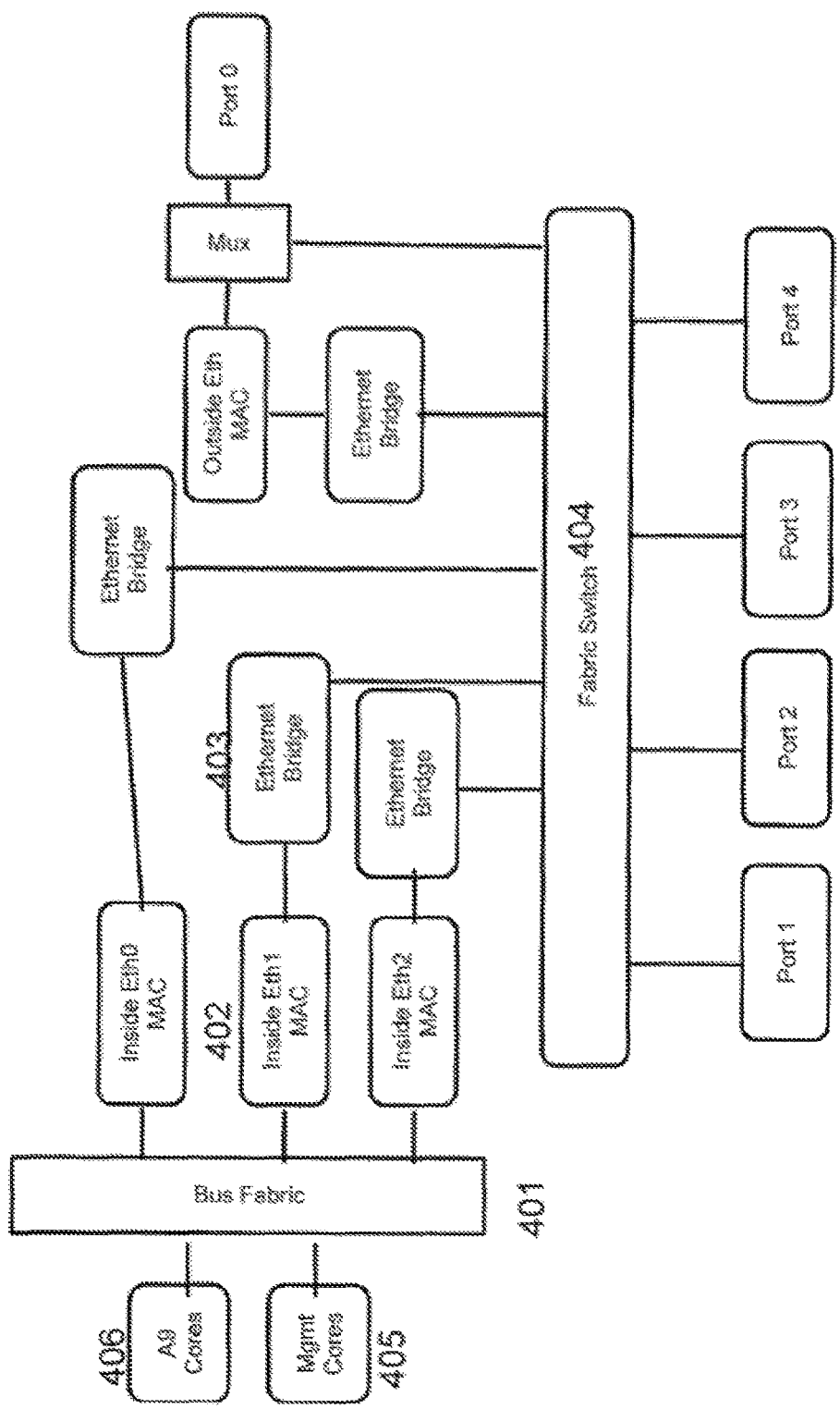
FIG. 4 illustrates a block diagram of an exemplary switch of the network aggregation system that may be leveraged for increased security in a data center.

In a second embodiment, the inter-management processor (906 in FIG. 4) traffic with the fabric is secured. In particular, the management processors within a server fabric (at each node as shown in FIG. 4) need a secure way to communicate between themselves with no possibility of sniffing or spoofing by the application processors within the fabric. The following techniques (alone or in combination) can be used to secure inter-management traffic:

Either set the management domain bit within the Routing Header (see above) Processor for the management processor and/or assign that MAC the Fabric Domain of 0.

Configure the fabric such that the Ethernet MAC for the management processor only accepts routing headers marked with the management domain bit, or having Fabric Domain of 0.

Configure the fabric such that the Ethernet MACs for the application processors do not have the management domain bit set, and have a non-zero Fabric Domain.

Creating Secure Private Management LAN

In a third embodiment, the fabric may be used to create a secure private management local area network (LAN.) Traditional rack-oriented servers may have an embedded BMC (baseboard management controller) and the BMC will have two paths for network connectivity including a shared management LAN with BMC traffic being routed out the main network port of the server and a Private management LAN with BMC traffic being routed out a private network port of the server.

Figure 6:
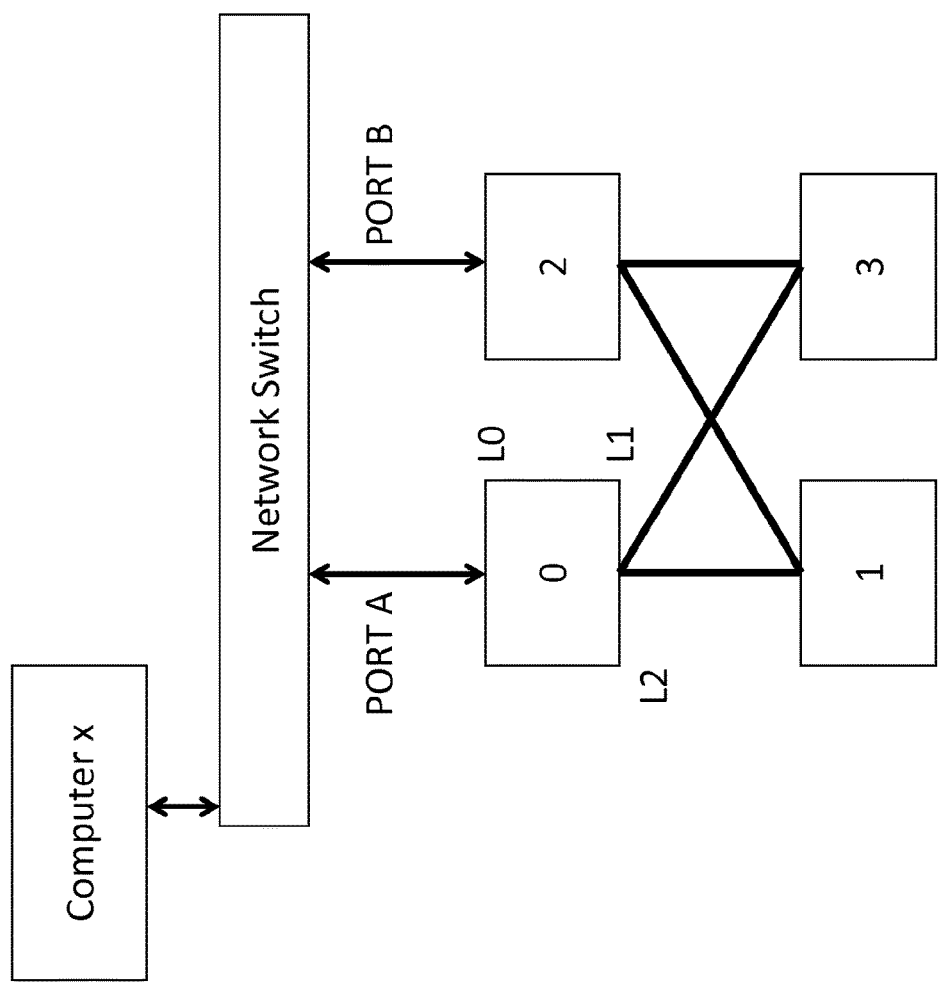
FIG. 6 illustrates a four-node server fabric with a network switch and enhanced security.

To illustrate this embodiment, FIG. 6 illustrates a four-node server fabric with a network switch and enhanced security with the goal of creating a private management LAN for the server fabric. The following technique (alone or in combination) can be used to secure the management traffic out of Eth1 801b:

Set the management domain bit within the Routing Header Processor for the management processor and assign that MAC the Fabric Domain of 0.

Configure the fabric such that the Ethernet MAC for the management processor only accepts routing headers marked with the management domain bit, or having Fabric Domain of 0.

Configure the fabric such that the Routing Header Processor for the outgoing MAC, block 910D of FIG. 4, of N31, Eth1 is configured to tag and only accept Fabric Domain of 0.

Configure the fabric such that the Ethernet MACs for the application processors do not have the management domain bit set, and have a non-zero Fabric Domain In this way, the management processors can securely communicate using the Management Domain, and management traffic will be secured on Eth1.

Using Constrained Routing Tables to Enhance Security in Multi-Tenant Fabrics

Figure 7:
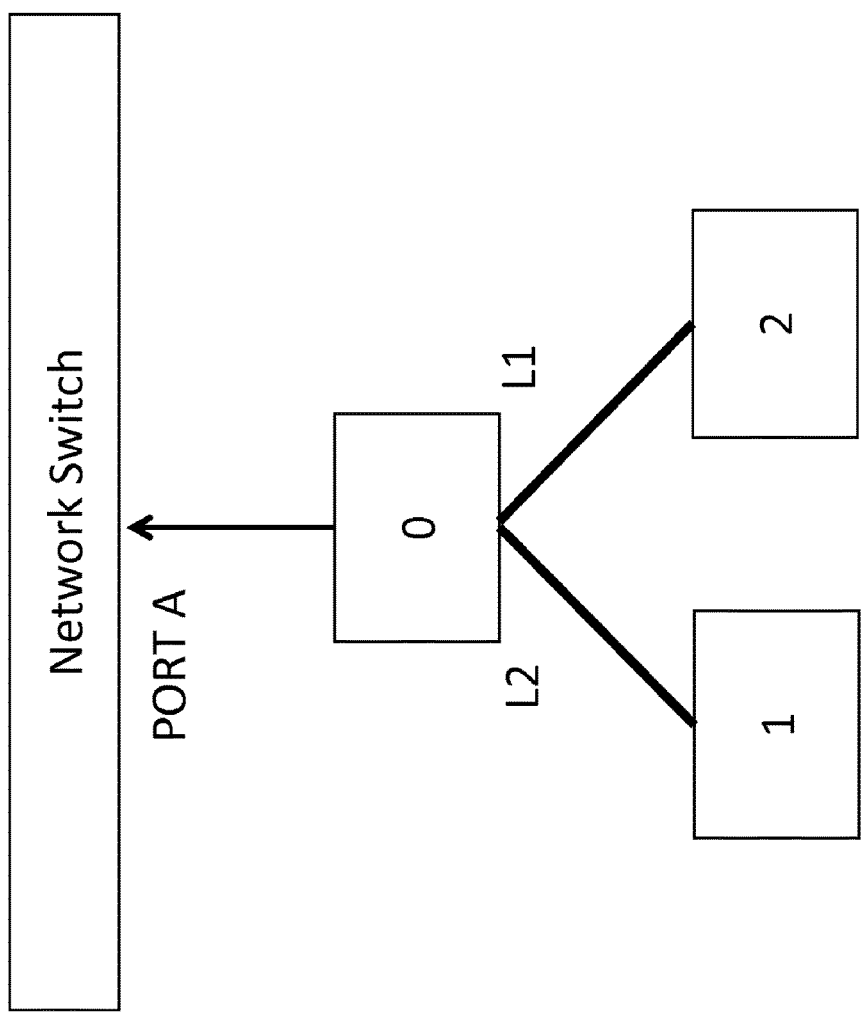
FIG. 7 illustrates a small three-node server fabric with a network switch and enhanced security.

In a fourth embodiment, constrained routing tables are used to enhance security in multi-tenant fabric. To illustrate this embodiment, FIG. 6 illustrates a four-node server fabric (nodes 0, 1, 2 and 3 in FIG. 6) with a network switch and enhanced security. The link numbers are depicted in the figure, as an example, packets leaving Node 0 to Node 1 would leave on link 2 (L2 as shown in FIG. 7). A typical unicast routing table for this fabric for Node 1 would look like the following:

TABLE 4

| Node 0 Full Fabric Routing Table | |
|---|---|
| Destination Node | Outgoing Link |
| 0 | — |
| 1 | L2 |
| 2 | L0 |
| 3 | L1 |

In the case in a multi-tenant fabric where Nodes 0 and 1 are being used by Customer A and Nodes 2 and 3 are being used by Customer B, routing can actually be denied from one customer to another by not having the routes such as in the below constrained routing table.

TABLE 5

| Node 0 Constrained Routing Table | |
|---|---|
| Destination Node | Outgoing Link |
| 0 | — |
| 1 | L2 |
| 2 | — |
| 3 | — |

Packet Processing Using OS Routing on Gateway Node

In a fifth embodiment, the fabric can perform packet processing using operating system (OS) routing on a gateway node. This embodiment is illustrated in FIG. 7 that shows a small three-node server fabric. The following technique can be used to create an IPS using the gateway node, node 0:

Assign the incoming Ethernet gateway traffic to the Eth0 MAC (block 902 of FIG. 4) and it can be designated as the Outside MAC.

Assign the fabric-side Ethernet traffic to the Eth1 MAC (block 903 of FIG. 4) and it can be designates as the Inside MAC.

Use Linux (or other OS equivalent) routing features to route traffic between the Inside MAC and the Outside MAC.

Linux (or other OS equivalent) IPS (e.g. Snort) or IDS software can then be run on the application processors (block 905 of FIG. 4) to inspect or block traffic between the fabric and the outside Ethernet.

Packet Processing on Arbitrary Nodes Using Non-Symmetric MCAMs

The sixth embodiment is directed to packet processing on arbitrary nodes using non-symmetric MCAMs. This embodiment is illustrated in FIG. 7 that shows the small three-node server fabric. The following technique can be used to create an IPS using an arbitrary node as the IPS (in this example node 2):

Initialize the MCAM on Node 0, the gateway node, such that all fabric MAC addresses map to Node 2

TABLE 6

| Asymmetric MCAM for Node 0 for Node 2 IPS/IDS | |
|---|---|
| MAC Address | Node |
| Node 0 MAC | 2 |
| Node 1 MAC | 2 |
| Node 2 MAC | 2 |

Initialize the MCAM on Node 2 to map the MAC addresses to the correct nodes.

TABLE 7

| Asymmetric MCAM for Node 2 for Node 2 IPS/IDS | |
|---|---|
| MAC Address | Node |
| Node 0 MAC | 0 |
| Node 1 MAC | 1 |
| Node 2 MAC | 2 |

Packets coming into the gateway node hit the fabric switch on node 0.

The destination MAC address on the packet gets translated by the Node 0 MCAM to a destination node, in this case Node 2 (for all fabric MAC addresses).

Packet gets routed to Node 2 and delivered to the application processor MAC on Node 2.

IPS/IDS software runs on node 2, then assuming the packet is not blocked forwards the packet back into the fabric for delivery.

The destination MAC address on the packet gets translated by the Node 2 MCAM to a destination node, in this case the correct destination node within the fabric, and gets delivered to the targeted destination node.

Packet Processing Using Local Management Processor

The seventh embodiment relates to packet processing using local management processor(s), which can be illustrated by the small three-node server fabric depicted in FIG. 7. The following technique can be used to create an IDS or other packet inspection and logging using the local management processor on each node:

Configure the fabric Promiscuous Vector to replicate packets to the management processor MAC (block 906 of FIG. 4). The Promiscuous Vector defines a list of ports to which the incoming packet should be replicated. This allows the management processor to declare to the switch that it should get a copy of the incoming packets, without knowledge or intervention of the source or destination of the packet transfer.

Packets entering or leaving Eth0 and Eth1 MACs (blocks 902 and 903 of FIG. 4) will be replicated to management processor MAC, block 906.

The management processor can then run IDS or other packet inspection or logging software not only unobtrusively to the OS and applications on the application processor, but without the OS or applications processor being aware of the management processor packet processing.

Security Enhancement of Having Non-Whitelisted Destination Macs Dropped at the Ingress Node The eighth embodiment is directed to a security enhancement of having Non-whitelisted destination MACs dropped at the ingress node which can be illustrated using the switch fabric in FIG. 7 to be able to enforce white-listing of destination MAC addresses (meaning that the network manager will have a list of known MAC addresses within the fabric or within the broadcast domain, and packets ingressing into the fabric that are not on the destination MAC whitelist will be immediately dropped.) The following technique can be used to create MAC address whitelists:

- The Network administrator collects all the MAC addresses within the broadcast domain, both inside and outside the fabric.
- All the MCAMs are initialized with the complete list of (MAC Address, Node ID, Port ID) mappings.
- For those MAC addresses that are outside the fabric, the MCAM mapping is to (Gateway Node ID, Outlink Port).
- The primary and secondary gateway node ID mappings in each switch are disabled.
- This results in packets entering the fabric that don't match the MAC address whitelist to be routed to the gateway node, but by invalidating the gateway node entries, the packets are dropped.
- This results in packets being dropped immediately at the ingress point that don't match the MAC address whitelist.

Additional Security Aspects

The security may also include secure fabric local Network Attached Storage (NAS) through private internal domains. There are domains do not have to go all the way to an uplink. Thus, the system can establish a domain between one server node and a node acting as a NAS server.

The system may also provide port scan and port sweep monitoring. A port sweep is the act of systematically scanning the ports on one or more computers by security attackers to find weakened access points to break into computer systems. A port scan is a series of messages sent by someone attempting to break into a computer to learn which computer network services, each associated with a port number, the computer provides. The port scan and port sweep are generally hard to detect at the IPS/IPD level because that are a large number of data flows to watch (and with port sweep many systems) and tracking of the accesses over time. Since the switch system described above has all traffic going into the cluster, the system can monitor for port scan/port sweep better than external appliances.

The system also may allow for the monitoring for a typical network traffic to/from a node. Since the system can monitor all rates over time, the system can monitor traffic to/from a node and isolate it, or flag it, if it exceeds (customer settable) tolerances.

The system may also provide isolation of traffic. In particular, in addition to operating system (OS) routing to separate multi-tenant traffic, the system can also provide physical isolation by cutting links.

The system may also permit customers to configure the topology of the switch. The configuration of the switch may prevent the sharing of links (avoiding a DOS at a link), or sharing of boards (to avoid fault sharing.)

The system may also use IP reputation processing for security. In particular, the blocking or allowing of access based on source address may be incorporated into any place in the switch that packet processing occurs. Using IP reputation processing, the system can support multiple equivalent servers with one server receiving traffic from trusted systems, one receiving traffic from less trusted systems, and one receiving from untrusted system. This could allow for faster/streamlined processing of trusted traffic, and more security checking of less trusted traffic.

The switch security (and the management processor in particular) may provide encryption services in which the keys never leave the trusted zone.

The switch system may also perform real mapping of external virtual local area networks (VLANs) to domains by having the uplink nodes being in their own domains. To provide the real mapping, the switch uses their downlinks as MACLinks (even though they go to our nodes) and uses routing through the downlinks to pick the desired domain (based on VLAN). For example, if the user wants to map a VLAN101 packet to Domain10, the uplink node would have the four other links configured as MACLinks, one of those links would go to another node (whose link is also configured as a MACLink with a Domain of 10, so any packet sent down that link goes into the fabric as Domain10.)

The use of the Outside Ethernet MAC (904 in FIG. 4) gives the system the ability to filter on VLANs, Source MAC, Destination MAC, etc. with perfect filters and wildcards or hashes within the Outlink. Thus, packets can be dropped before they enter the fabric and that is another way of implementing security enhancement of having Non-Whitelisted Destination MACs dropped at the Ingress Node or dropping of packets based on a source address.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A system comprising:
   a routing header unit configured to set a management domain bit in a routing header of one or more frames, wherein the management domain bit comprises an identifier that indicates a particular network domain for which the routing header unit belongs and indicates access to a management domain; and
   a fabric switch connected to the routing header unit and to a plurality of external ports, wherein the fabric switch is configured to perform packet processing based, at least in part, on the management domain bit.

2. The system of claim 1, further comprising a management processor configured to transmit the one or more frames.

3. The system of claim 2, wherein the management domain bit is set within the routing header unit.

4. The system of claim 3, further comprising assigning the particular network domain to zero.

5. The system of claim 2, wherein the management processor only accepts routing headers marked with the management domain bit.

6. The system of claim 2, wherein the application processors for nodes coupled to the fabric switch do not have the management domain bit set.

7. The system of claim 1, further comprising a media access control (MAC) unit connected to the fabric switch, wherein the MAC unit is configured to only accept frames having the management domain bit.

8. The system of claim 7, wherein the routing header unit is configured to prepend routing heads to packets generated by an associated MAC unit, and wherein the routing heads include the management domain identifier associated with the associated MAC unit.

9. The system of claim 7, further comprising another routing header unit associated with an outgoing MAC unit, wherein the other routing header unit is configured to tag and only accept frames having management domain bits that indicate the fabric domain of zero.

10. The system of claim 1, wherein the fabric switch is further configured to stop a packet that has been assigned a default domain identifier.

11. A method comprising:
interconnecting a plurality of nodes with a plurality of links to form a server fabric, wherein each of the plurality of nodes includes:
a routing header unit configured to set a management domain bit in a routing header of one or more frames, wherein the management domain bit comprises an identifier that indicates a particular network domain for which the routing header unit belongs and indicates access to a management domain; and
a fabric switch connected to the routing header unit and to a plurality of external ports, wherein the fabric switch is configured to perform packet processing based, at least in part, on the management domain bit;
generating data packets at a media access control (MAC) unit associated with a management processor; and
routing, by the fabric switch, the data packets in the server fabric based, at least in part, on the identifier.

12. The method of claim 11, wherein routing the data packets comprises routing the data packets to another MAC unit, and wherein the other MAC unit is configured to only accept data packets having a header with the management domain bit.

13. The method of claim 12, wherein the management domain bit further indicates a fabric domain, and wherein the MAC unit is assigned the fabric domain.

14. The method of claim 13, wherein the fabric domain is set to zero.

15. The method of claim 14, further comprising tagging and only accepting, by another routing header unit, frames having management domain bits that indicate the fabric domain of zero.

16. The method of claim 11, further comprising prepending, by the routing header unit, routing heads to the data packets, wherein the routing heads include the identifier associated with the MAC unit.

17. The method of claim 11, further comprising stopping, by the fabric switch, a packet that has been assigned a default domain identifier.

18. A device comprising:
a routing header unit configured to set a management domain bit in a routing header of one or more frames, wherein the management domain bit comprises an identifier that indicates a particular network domain for which the routing header unit belongs and indicates access to a management domain; and
a fabric switch connected to the routing header unit and to a plurality of external ports, wherein the fabric switch is configured to perform packet processing based, at least in part, on the management domain bit.

19. The device of claim 18, further comprising a media access control (MAC) unit connected to the fabric switch, and wherein the MAC unit is configured to only accept frames having the management domain bit.

20. The system of claim 18, wherein the management domain bit further indicates a fabric domain, and wherein the MAC unit is assigned the fabric domain.

* * * * *